United States Patent
Sonoda et al.

(10) Patent No.: US 8,896,533 B2
(45) Date of Patent: Nov. 25, 2014

(54) DISPLAY DIRECTIONAL SENSING

(71) Applicant: Lenovo (Singapore) PTE, Ltd, New Tech Park (SG)

(72) Inventors: Nao Sonoda, Kanagawa-ken (JP); Hideki Kashiyama, Kanagawa-ken (JP)

(73) Assignee: Lenova (Singapore) PTE. Ltd., New Tech Park (SG)

( * ) Notice: Subject to any disclaimer, the term of this patent is extended or adjusted under 35 U.S.C. 154(b) by 142 days.

(21) Appl. No.: 13/663,394

(22) Filed: Oct. 29, 2012

(65) Prior Publication Data

US 2014/0118256 A1 May 1, 2014

(51) Int. Cl.
*G09G 5/08* (2006.01)
*G06F 3/0346* (2013.01)

(52) U.S. Cl.
CPC ...... *G06F 3/0346* (2013.01); *G09G 2340/0492* (2013.01)
USPC .......................................... 345/158; 345/659

(58) Field of Classification Search
CPC ......... G06F 3/0346; G06F 3/017; G06T 3/60; G06K 9/3208
USPC .......................................... 345/156–158, 659
See application file for complete search history.

(56) References Cited

U.S. PATENT DOCUMENTS 7,932,882 B2 4/2011 Shimotono et al.
2011/0298829 A1 12/2011 Stafford et al.

FOREIGN PATENT DOCUMENTS

JP 2011258191 12/2011

*Primary Examiner* — Ricardo L Osorio
(74) *Attorney, Agent, or Firm* — Shimokaji & Associates, P.C.

(57) ABSTRACT

An electronic device includes a display with an image display area configured to change orientation based on a change of position of the device. Upon detection of the position change, a camera may capture an image adjacent the device. The orientation of the image display area may be moved relative to a reference feature captured in the image.

16 Claims, 5 Drawing Sheets

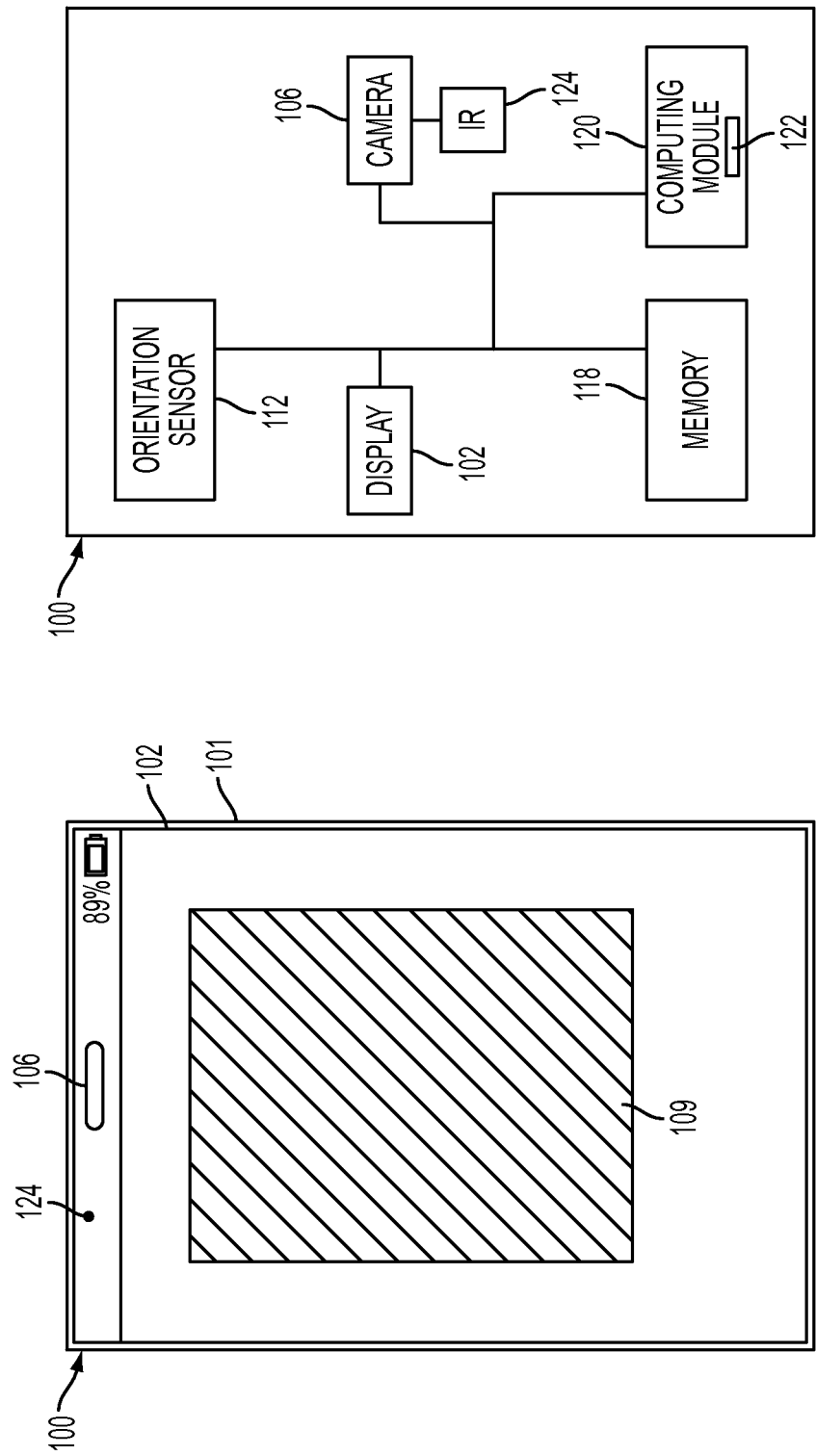

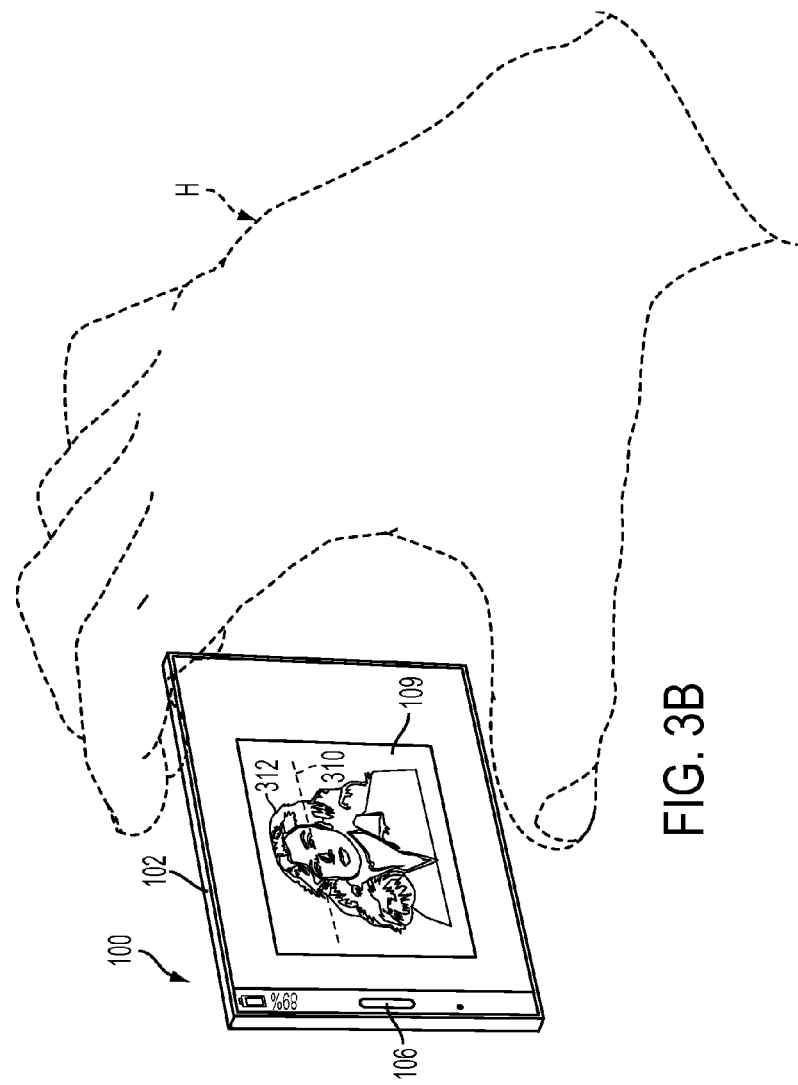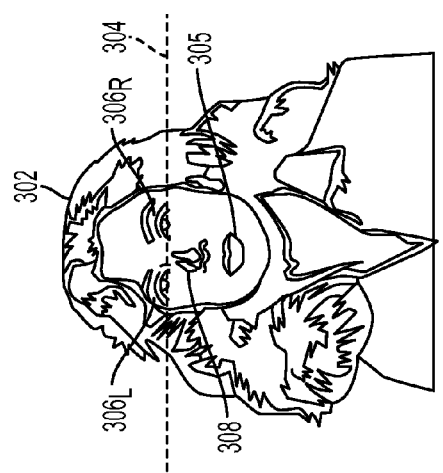

US 8,896,533 B2

DISPLAY DIRECTIONAL SENSING

BACKGROUND OF THE INVENTION

The present invention relates generally to display devices and, more particularly, to display directional sensing of an electronic device.

Electronic devices commonly have a display feature incorporated. In conventional displays, the orientation of an image displayed may be fixed. More recent devices have incorporated a feature that may sense movement of the host device which may trigger a change in the orientation of a displayed image. For example, a mobile phone or tablet device may include auto rotation of an image using a G-sensor. Typically, the auto rotation function may be designed to function while a user is standing or sitting up right. However, if the device is horizontal to the ground, the device may become confused in displaying the orientation of the image may so that it is aligned with the user.

Therefore, it can be seen that there is a need for automatically controlling the orientation of an image on a device regardless of the position the device is being supported.

SUMMARY

In one aspect, an apparatus comprises a housing; a display on one side of the housing; a camera coupled to the housing; an orientation sensor coupled to the housing; a computing device coupled to the orientation sensor; and an image display area on the display controlled by the computing device, wherein the computing device is configured to: receive an indication of a change in position of the apparatus provided by the orientation sensor, trigger the camera to capture an image, analyze the captured image for a reference feature, and move an orientation of the image display area to coincide with a position of the reference feature.

In another aspect, a method for displaying an orientation of an image area on a display comprises detecting a change in position of an orientation sensor coupled to the display; triggering a camera, upon the detection, to capture an image of a reference feature adjacent the display; recognizing an orientation position of the reference feature in the captured image; and rotating a view shown in the image area to align with the orientation position of the reference feature.

In a further aspect, a computer readable medium for determining an orientation view of a display on an electronic device comprises a computer usable program code. The computer usable program code may be configured to: detect a change in position of the display; trigger a camera, upon the detected change in position, to capture an image of a user holding the electronic device; enable a facial recognition function to recognize facial features in the captured image of the user; determine an orientation of the user based on the captured image of the user; and align a view of an image area in the display to align with the orientation of the user.

These and other features, aspects and advantages of the present invention will become better understood with reference to the following drawings, description and claims.

BRIEF DESCRIPTION OF THE DRAWINGS

FIG. 1A is a front view of a device with an electronic display and a rotatable image area according to an exemplary embodiment of the present invention;

FIG. 1B is a block diagram showing a schematic connection of internal elements of the device of FIG. 1A;

FIG. 3A is a perspective view showing the device of FIG. 1A capturing an image of a user holding the device;

FIG. 3B is a front view of the image captured according to FIG. 3A; and

DETAILED DESCRIPTION OF EMBODIMENTS

Figure 2A:
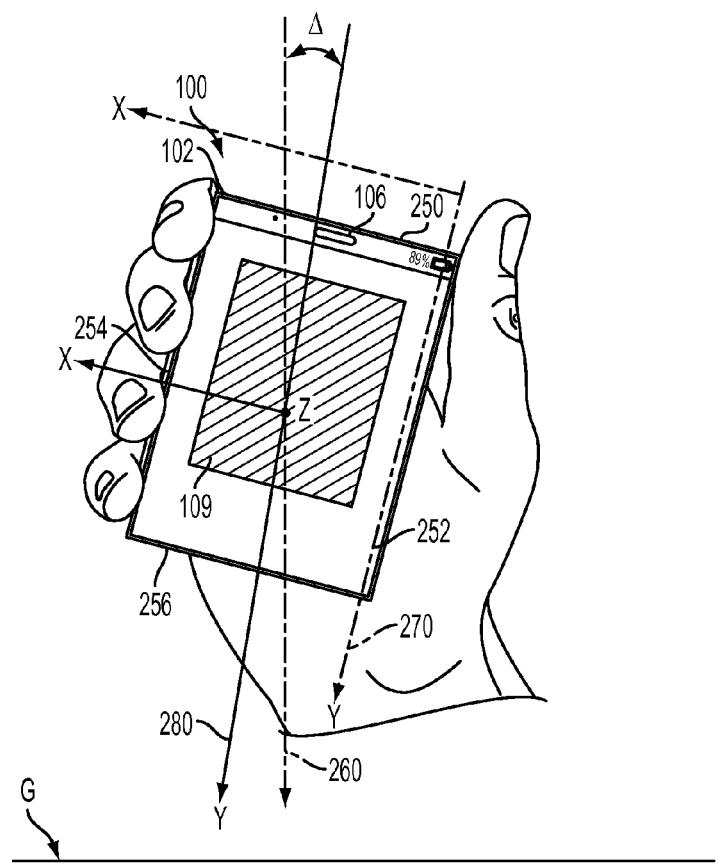
FIG. 2A is a front view of the device of FIG. 1A being rotated about an axis orthogonal to a ground level.

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide re-orientation of a display image on an electronic device relative to a reference feature captured in an image taken by the device. A reference alignment may be determined based on the reference feature. The term "orientation" as used in this disclosure may refer to a view of an image area on the display being moved or rotated so that its view coincides with a perspective of a user holding the device, for example, so that the image shown in the display is viewed "right side up" relative to the position of the viewer's eyes.

Exemplary embodiments may take the form of an entire hardware embodiment, an entire software embodiment (including firmware, resident software, micro-code, etc.) or an embodiment combining software and hardware aspects that may all generally be referred to herein as a "circuit," "module" or "system." Furthermore, exemplary embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction performance system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wired, wire line, optical fiber cable, RF, etc.

Computer program code for carrying out operations of exemplary embodiments may be written in any combination of one or more programming languages, including an object oriented programming language such as Java™, Smalltalk™, C++ or the like, and conventional procedural programming languages, such as the "C" programming language or similar programming languages. The program code may execute entirely on the user's computing device, partly on the user's computing device, as a stand-alone software package, or partly on the user's computing device and partly on a remote computing device.

Exemplary embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIGS. 1A and 1B, an electronic display device 100 is shown according to an exemplary embodiment of the present invention. The display device 100 may be, for example, selected from a group consisting of a game controller, a portable gaming device, a cell phone, a camera, a tablet, a laptop, a personal digital assistant (PDA), a portable music player, a portable video player, a remote control, a digital photo frame, a camcorder, a portable television, a global positioning system (GPS) device, a smart phone, a network base station, a media player, a navigation device, an e-mail device, a digital-video-recorder (DVR), a security system (e.g., a door or gate access system), or a combination of any two or more of these data processing devices or other data processing devices. The display device 100 may comprise any type of electronic device, general purpose computing device or special purpose computing device that includes a processor, other circuitry, or logic operable to perform a screen switch process described herein to facilitate a user's view of an image on display.

In an exemplary embodiment, the display device 100 may include a housing 101, a screen display 102, a camera 106, and an image display area 109 viewable from an exterior of the display device 100. In some embodiments, an infra-red sensor 124 may be included on the housing 101 exterior. The display device 100 may also include an orientation sensor 112, a memory module 118, and a computing device 120. The orientation sensor 112, the memory module 118, and the computing device 120 may be located within the housing 101. Computer readable code and files 122 may be stored in some combination between the memory 118 and the computing device 120. In an exemplary embodiment, the computing device 120 may be coupled to and configured to receive data from and control the display 102, the camera 106, the orientation sensor 112, the memory module 118, and the infra-red sensor 124. In some embodiments, the camera 106 may be continuously operated. In some embodiments, the camera 106 may be operated only once a triggering event occurs. The computing device 120 may be for example, a processor, a central processing unit (CPU), or other computing apparatus.

The display 102 may be implemented with liquid crystal display (LCD) technology, light emitting polymer display (LPD) technology, or some other display technology. The display 102 may be configured to respond to haptic and/or tactile contact by a user. In some implementations, the display 102 may comprise a multi-touch-sensitive display. A multi-touch-sensitive display may, for example, process multiple simultaneous touch points, including processing data related to the pressure, degree, and/or position of each touch point. An image display area 109 in the display 102 may be configured to show images, for example, in portrait or landscape view orientations or other angles in between the portrait position and landscape position. In an exemplary embodiment, the image display area 109 may rotate the view of an image as a user moves or rotates the device display 100. In an exemplary embodiment, the computing device 120 may determine the orientation of the image display area 109 relative to the user and may change the orientation of the image displayed accordingly.

The orientation sensor 112 may be for example, an accelerometer, a G-sensor, or a rotational sensor (for example, a gyroscopic based sensor). In some embodiments, the orientation sensor 112 may be a dual-axis accelerometer. In some embodiments, the orientation sensor 112 may be a tilt sensor, an electronic compass or other suitable sensors, or combinations thereof configured to detect a position change of the orientation sensor 112 with respect to, for example, gravity or a horizontal ground plane reference. In some embodiments, the display device 100 may comprise two or more sensors, such as an accelerometer and an electronic compass.

As will be appreciated by persons skilled in the art, an accelerometer is a sensor which converts acceleration from motion (e.g., movement of the display device 100 or a portion thereof due to a strike force) and gravity which are detected by a sensing element into an electrical signal (producing a corresponding change in output) and may be available in one, two or three axis configurations. Accelerometers may produce digital or analog output signals depending on the type of accelerometer. Generally, two types of outputs may be available depending on whether an analog or digital accelerometer is used: (1) an analog output requiring buffering and analog-to-digital (A/D) conversion; and (2) a digital output which is typically available in an industry standard interface, such as an SPI (Serial Peripheral Interface) or I2C (Inter-Integrated Circuit) interface.

The output of an accelerometer is typically measured in terms of the gravitational acceleration constant at the Earth's surface, denoted by "g", which is approximately 9.81 m/s$^2$ (32.2 ft/s$^2$) as the standard average. The accelerometer may be of various types including, but not limited to, a capacitive, piezoelectric, piezoresistive, or gas-based accelerometer. The range of accelerometers may vary up to the thousands of g's, however, for portable electronic devices, "low-g" accelerometers may be used. Examples of low-g accelerometers which may be used are micro electro-mechanical systems (MEMS) digital accelerometers from Analog Devices, Inc. (ADI), Freescale Semiconductor, Inc. (Freescale) and STMicroelectronics N.V. of Geneva, Switzerland.

Figure 2B:
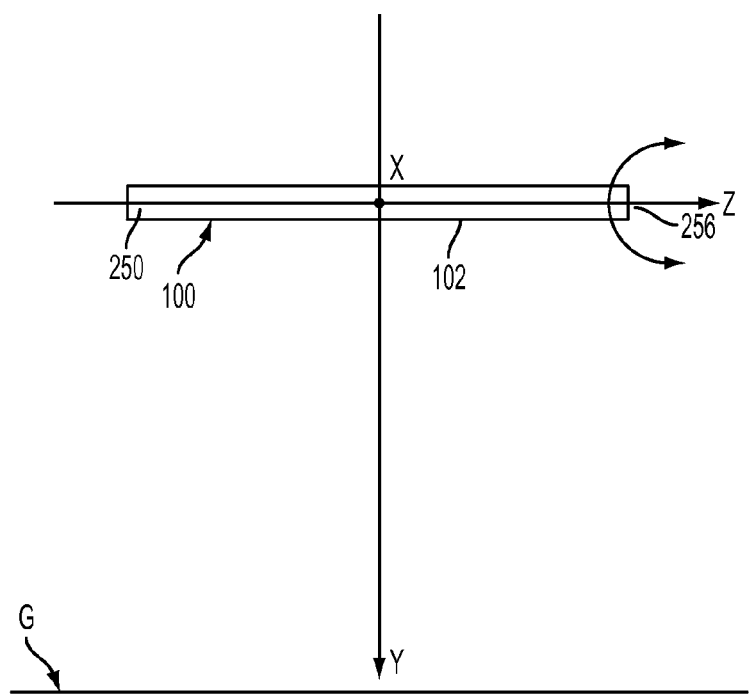
FIG. 2B is an edge view of the device of FIG. 1A being rotated about an axis planar to a ground level.

Referring now to FIGS. 2A and 2B, exemplary positioning of the display device 100 and detection of its movement by the orientation sensor 112 is shown relative to a reference point. It will be understood that reference to internal components of the display device 100 as described in FIG. 1A may be present while describing features of the present invention. In an exemplary embodiment, the orientation sensor 112 may detect a position change of the display device 100. The orientation sensor 112 may detect when the sensor has been moved with respect to a ground reference plane "G" or rotated about an axis relative to the ground reference plane "G".

FIG. 2A shows the display device 100 being rotated about an axis 260 orthogonal to a ground level, for example, the ground reference plane "G". The axis 260 may point in the direction of gravity. For a dual-axis orientation sensor 122, a measurement axis 280 may define a first "Y" axis through the device 100 running, for example, from a top edge 250 of the device 100 down through a bottom edge 256. The axis 280 may be parallel to a side edge 252 and 254. A second "Y" axis 270 may run along the side edge 252 parallel to the first "Y" axis 280. "X" axes may be orthogonal to the "Y" axes 270 and 280. The "X" axes may run, for example, parallel to the top and bottom edges 250 and 256. The display 102 may face outward along a "Z" axis. The 'Z' axis may be orthogonal to the "X' and "Y" axes and parallel to the ground reference plane "G". The axis 280 may be aligned with the axis 260 when, for example the top edge 250 is parallel to the ground reference plane "G" and the device 100 may be considered in an upright position displaying, for example, a "portrait" orientation on the image display area 109. When the display 102 is rotated, for example clockwise as shown, the computing device 120 may read the amount of movement the measurement axis 280 has moved from the axis 260.

Movement may be measured by change in angular position, for example, as in Euler angles. Movement and change in position may also be referred to in changes of the display device's 100 yaw, pitch, or roll. In an exemplary embodiment, the amount of movement measured, for example, the magnitude of an angle α between the measurement axis 280 and the axis 260 may be represented by the symbol Δ. In an exemplary embodiment, the memory 118 may store a threshold value for angle α. When Δ exceeds the threshold value for angle α, the computing device 120 may trigger use of the camera 106 to capture an image.

While movement has been described with respect to the "Y" axis 280, it will be understood that the measured Δ may be calculated for rotation about any of the axes running through the display device 100, shown or otherwise. For example, while the foregoing has been described with movement of the device 100 being performed orthogonal to the ground reference plane "G" in a clockwise rotation, it will be understood that other changes in position of the device 100 may be detected by the orientation sensor 112. Referring to FIG. 2B, the display screen 102 may initially be planar to the ground reference plane "G". The 'Y' axis remains pointing toward gravity and the ground reference plane but the display 102 faces the "Y" axis while the "Z" axis runs through the top edge 250 and bottom edge 256 and is planar to the ground reference plane "G". The orientation sensor 112 may detect rotation of the display device 100 around the "Z" axis.

Referring now to FIGS. 3A and 3B, an exemplary operation of the device 100 is shown according to an exemplary embodiment of the present invention. The device 100 is being held by the hand "H" of a user. FIG. 3A illustrates the device 100 being moved so that the orientation sensor 112 (FIG. 1B) has triggered the camera 106. The camera 106 may be disposed to capture an image of a reference feature adjacent the display 102. In an exemplary embodiment, the camera 106 may capture an image 312 of the user 302. The computing device 120 may be configured to recognize an orientation position of the reference feature in the captured image. For example, the device 100 may include facial recognition software configured to recognize facial features present in the image of the user's face captured by the camera 106. In an exemplary embodiment, the features of the face recognized may include a nose 308, a mouth 305, and a set of eyes ($306_L$ and $306_R$) (referred to generally as eyes 306). In another exemplary embodiment, the position of the eyes may be detected by the infra-red sensor 124 (FIG. 1B). The computing device may be configured to determine an axis 304 across the eyes $306_L$ and $306_R$. The nose 308 and mouth 305 may be detected as located below the axis 304. The computing device 120 may re-create the axis 304 onto the image display area 109 as an axis 310. The computing device 120 may determine the position of the nose 308 and/or the mouth 305 relative to the eyes $306_L$ and $306_R$ in deciding the position of the axis 310. The orientation of the image 312 may be moved or rotated to align perpendicular with the axis 310 so that the position of the eyes 306 along with the nose 308 and/or mouth 305 in the captured image 312 align with the position of the user's 302 eyes, nose and/or mouth.

In general, a facial analysis system present on the display device 100 may be defined in a computer application, hardware, or a combination of hardware and software, for automatically identifying or verifying a position of a person's head from a digital image or a video frame from a video source. In one embodiment, facial reference features captured for a user 302 may be stored in a database, for example, in memory module 118. The database may be coupled to logic that allows identification of specific facial features, while allowing for variations in expected placement of features. A user 302 may be identified relatively quickly so orientation of the image display area 109 may be performed quicker. Facial recognition algorithms may identify a user 302 by extracting landmarks or features from an image of the subject's face. For example, an algorithm may analyze the relative position, size, or shape of the eyes 306, nose 308, mouth 305, cheekbones, jaw line, forehead, chin, etc within a captured image 312. These features may then be used to search for other stored images with matching features or to calculate probabilities that specific human features are present, and then to calculate their location within the image. In still another embodiment, an algorithm may be used to normalize a gallery of captured face images 312 and may compress the face related data, only saving the data in the image that is useful for face detection. This will provide face metadata that can be quickly indexed and searched.

In another exemplary embodiment, in addition to face recognition, objects on or around the user 302 may be used to detect orientation. For example, arbitrary objects may be recognized and their captured orientation may be checked against a database of files that may include an expected orientation. For example, the camera 106 may capture a chair in the background behind the user 302. The computing module 120 may recognize the shape of the chair and may check the memory module 118 for the expected orientation direction of the chair within the image display area 109. If the chair appears in the captured image 312 in a direction inconsistent with the expected orientation, the computing device 120 may rotate the image display area 109 so that the chair is displayed in its expected orientation. Other arbitrary objects captured within the image 312 may include items worn by the user 302. For example, glasses, hats, ear buds, headphones, shirt collars, necklaces, hair pins, etc. may be recognized and the computing device 120 may determine their expected orientation similar to the example provided using a chair. These objects alone or used in conjunction with detected facial features may be used to detect orientation and/or position of the image display area 109 relative to the orientation of the user's face.

Facial recognition may be performed at different frequencies of image capture. For example, face recognition may be performed at each video frame, every 10 frames, every second, etc. The frequency of facial recognition analysis may depend on the amount of processing required and the responsiveness of the display device 100. In one embodiment, the view orientation may not change unless several frames have been detected requiring a change in view orientation. This may avoid the problem of switching views when the user is playing a game and performs an abrupt movement of the device before returning to the previous position, unintentionally triggering the display device's 100 mechanisms for changing the orientation of the image display area 109. In another embodiment, the facial recognition frequency may be increased when the computing device 120 detects frequent movement of the user 302 holding the display device 100 so that a change in display image area 109 orientation may be needed for consistent viewing.

Figure 4:
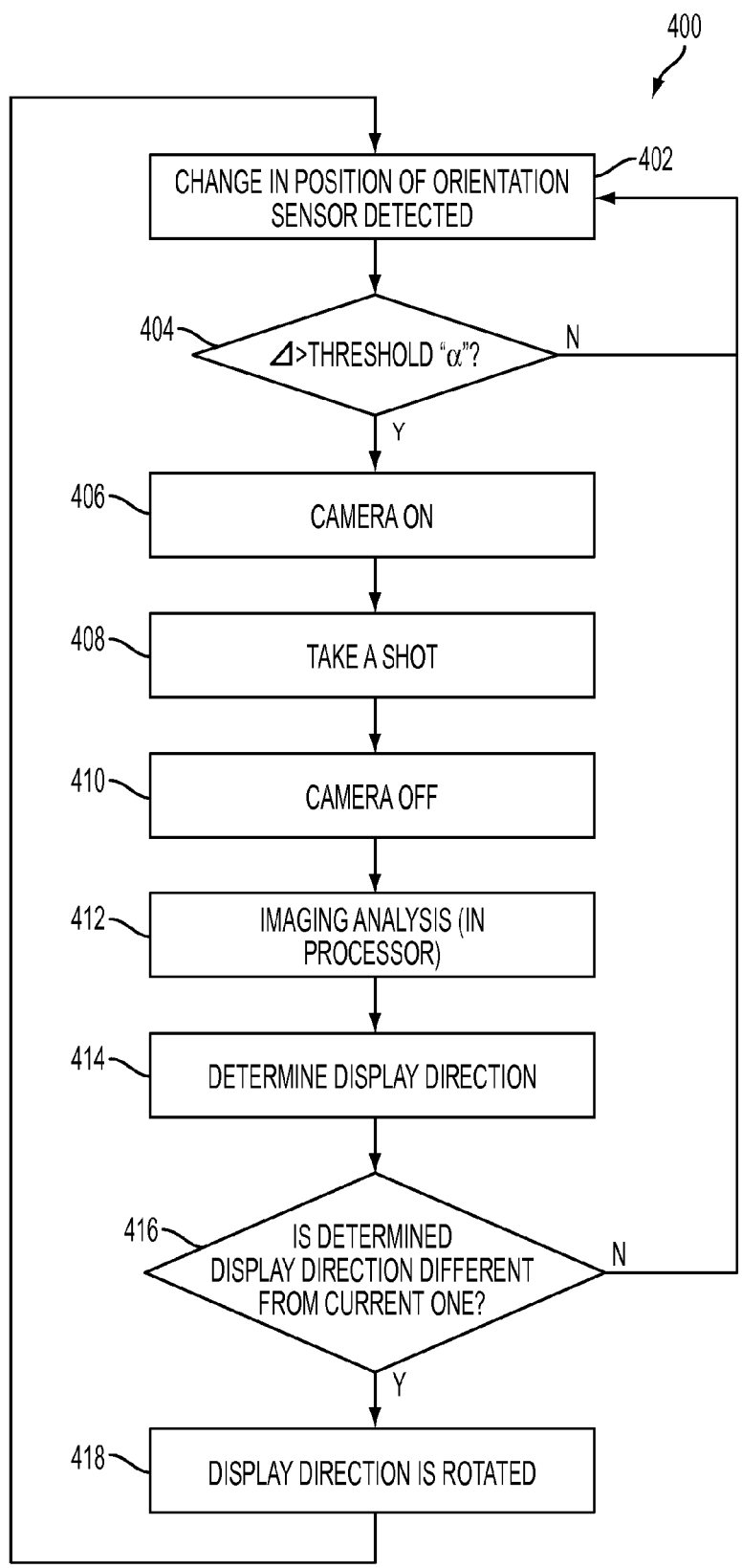
FIG. 4 is a flow diagram of a process of orienting display direction according to another exemplary embodiment of the present invention.

Referring now to FIG. 4, a method 400 for displaying an orientation of an image area on a display is shown according to an exemplary embodiment of the present invention. The computing device 120 may receive data detecting (402) a change in position of the orientation sensor. The computing device 120 may determine (404) if Δ exceeds the threshold value for angle α. The computing device 120 may trigger (406) operation of the camera 106 when the threshold value is exceeded. In some embodiments, the camera 106 may be continuously on while in some embodiments, the camera 106 may be dormant until the computing device 120 commands the camera 106 to capture an image. Otherwise, if the threshold value is not exceeded, the computing device 120 waits until it receives data detecting (402) a change in position of the orientation sensor 112 again. The computing device 120 may capture (408) an image with the camera 106. In some embodiments, the computing device 120 may cease (410) operation of the camera 106 to conserve power in the display device 100. The computing device 120 may perform (412) imaging analysis of the captured image. The computing device 120 may determine (414) an orientation direction for the image display area 109 based on the imaging analysis. The orientation direction may be aligned with a reference feature detected in the captured image. The computing device 120 may determine (416) if the determined orientation direction of the image display area 109 is different than an orientation direction currently displayed within the image display area 109. If they differ, then the image display area 109 may be rotated to the determined orientation direction. Otherwise, the computing device 120 waits until it receives data detecting (402) a change in position of the orientation sensor 112 again.

It should be understood, of course, that the foregoing relate to exemplary embodiments of the invention and that modifications may be made without departing from the spirit and scope of the invention as set forth in the following claims.

We claim:

1. An apparatus, comprising:
an image display area;
a camera;
an orientation sensor in communication with the camera;
a computing device coupled to the orientation sensor and the image display area; and
wherein the computing device is configured to:
receive an indication from the orientation sensor of a change in position of the apparatus which change exceeds a threshold value,
turn the camera on and capture an image;
analyze the captured image for a reference feature that is unassociated with a user's face and head,
orient the image display area in accordance with the reference feature, and
turn the camera off until receiving another indication of another change in position of the apparatus that exceeds the threshold value.

2. The apparatus of claim 1, wherein the computing device controls the image display area to switch between a landscape orientation and a portrait orientation.

3. The apparatus of claim 1, wherein the camera is on the same side as the image display area.

4. The apparatus of claim 1, comprising an infra-red sensor coupled to the computing device.

5. The apparatus of claim 1, wherein the orientation sensor is configured to detect movement of the apparatus so that the image display area is planar to a ground level.

6. The apparatus of claim 5, wherein the camera is triggered by the orientation sensor sensing a change in the position of the apparatus relative to the ground level, wherein the change is greater than the threshold level.

7. A method for orienting an image display area of a display device, comprising:
detecting a threshold change in position of an orientation sensor of the display device;
turning on a camera of the display device upon detecting the threshold change in position of the orientation sensor;
capturing with the camera an image of a reference feature adjacent the display;
recognizing an orientation position of the reference feature in the captured image; and
rotating a view shown in the image display area to align with the orientation position of the reference feature; and
turning the camera off until detecting another threshold change in position of the orientation sensor.

8. The method of claim 7 further comprising determining if a direction of the view shown in the image display area is different than a direction of the orientation position of the reference feature.

9. The method of claim 7 further comprising recognizing a face of a user holding the display device, wherein the reference feature is on the face.

10. The method of claim 9 further comprising determining a relative position of the reference feature on the face to other reference features on the face.

11. The method of claim 10 further comprising determining an axis along the face and the orientation position of the reference feature based on the determined axis.

12. A computer readable medium for determining an orientation view of a display on an electronic device having computer usable program code embodied therewith, the computer usable program code configured to:
   detect a change in position of the display;
   determine if the change in position exceeds a threshold value;
   turn on a camera coupled to the display if the threshold value is exceeded;
   use the camera to capture an image of a user of the electronic device;
   enable a facial recognition function to recognize facial features in the captured image of the user;
   determine an orientation of the user based on the captured image of the user;
   align a view of an image display area in the display to align with the orientation of the user; and
   turn off the camera if the threshold value is not exceeded.

13. The computer program code of claim 12 further comprising computer program code configured to determine positioning of the facial features and determine the orientation of the user based on the positioning of the recognized facial features.

14. The computer program code of claim 13 further comprising computer program code configured to determine an axis of the user's face based on the positioning of the facial features and align the axis of the face with an axis of the image display area.

15. The computer program code of claim 13 further comprising computer program code configured to determine a position of a nose on the user's face relative to a position of eyes on the face and align a top of the view of the image display area to the display to the user's eyes.

16. The computer program code of claim 12 further comprising computer program code configured to turn off the camera after capturing the image of the user holding the electronic device.

* * * * *